United States Patent
Yamamoto et al.

(10) Patent No.: US 6,438,890 B1
(45) Date of Patent: *Aug. 27, 2002

(54) FISHING ROD OF REEL MOUNTING TYPE

(75) Inventors: Shigeru Yamamoto, Saitama; Yoshiharu Kiyota, Tokyo; Teiji Matsubara, Tokyo; Hiroshi Hashimoto, Tokyo, all of (JP)

(73) Assignee: Daiwa Seiko, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,839

(22) Filed: May 26, 1999

(30) Foreign Application Priority Data

May 29, 1998 (JP) .............................. 10-166300
Jan. 28, 1999 (JP) .............................. 11-019401

(51) Int. Cl.[7] .............................. A01K 87/06
(52) U.S. Cl. .............................. 43/22
(58) Field of Search .............................. 43/22

(56) References Cited

U.S. PATENT DOCUMENTS

| | | | | |
|---|---|---|---|---|
| 2,485,144 A | * | 10/1949 | Espenship | 43/22 |
| 2,753,646 A | * | 7/1956 | Colmery | 43/22 |
| 3,098,313 A | * | 7/1963 | Portz | 43/22 |
| 3,123,931 A | * | 3/1964 | Stephens | 43/22 |
| 3,233,355 A | * | 2/1966 | Chion | 43/22 |
| 3,698,118 A | * | 10/1972 | Schultz | 43/22 |
| 4,045,902 A | * | 9/1977 | Ohmura | 43/22 |
| 5,199,207 A | * | 4/1993 | Nakagawa | 43/22 |
| 5,347,742 A | * | 9/1994 | Ohmura | 43/22 |
| 5,481,820 A | * | 1/1996 | Ohmura | 43/22 |
| 5,600,915 A | * | 2/1997 | Ohmura | 43/22 |

FOREIGN PATENT DOCUMENTS

| | | |
|---|---|---|
| JP | 2-3258 | 1/1990 |
| JP | 10-52195 | 2/1998 |

* cited by examiner

Primary Examiner—Kurt Rowan
(74) Attorney, Agent, or Firm—Liniak, Berenato, Longacre & White

(57) ABSTRACT

The present fishing rod comprises a pair of hood portions (14, 16) which are respectively disposed back and forth in such a manner that they are opposed to each other, while the two hood portions (14, 16) respectively include openings for receiving the leg of the reel. At least one of the pair of hood portions, that is, the hood portion (16) is of a movable type, while the movable hood portion (16) can be moved back and forth as a nut member (18) is rotated. The present fishing rod further comprises elastic mechanism (20, 22) and an engaging portion (24) which are respectively so disposed as to extend between two of three elements, that is, a main body portion (12) fixedly secured to a rod pipe (10), the nut member (18) and movable hood portion (16): in particular, the elastic mechanism (20, 22) are formed in one of the above two elements, that is, the main body portion (12); and, the engaging portion (24) is formed in the other, that is, the nut member (18) in such a manner that the elastic mechanism (20, 22) can be removably engaged with the engaging portion (24) by a given force. The elastic portion (22) of the elastic mechanism is formed considerably larger than the engaging portion (24), or the free portion of the elastic mechanism (20, 22) that is not restricted by the engaging portion (24) is formed larger than the portion of the elastic mechanism (20, 22) that is contacted with and restricted by the engaging portion (24).

16 Claims, 11 Drawing Sheets

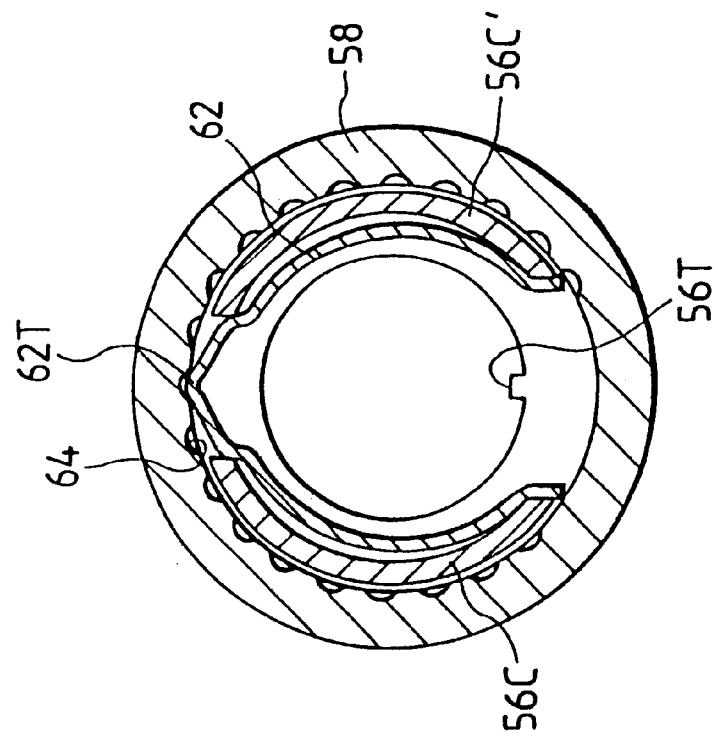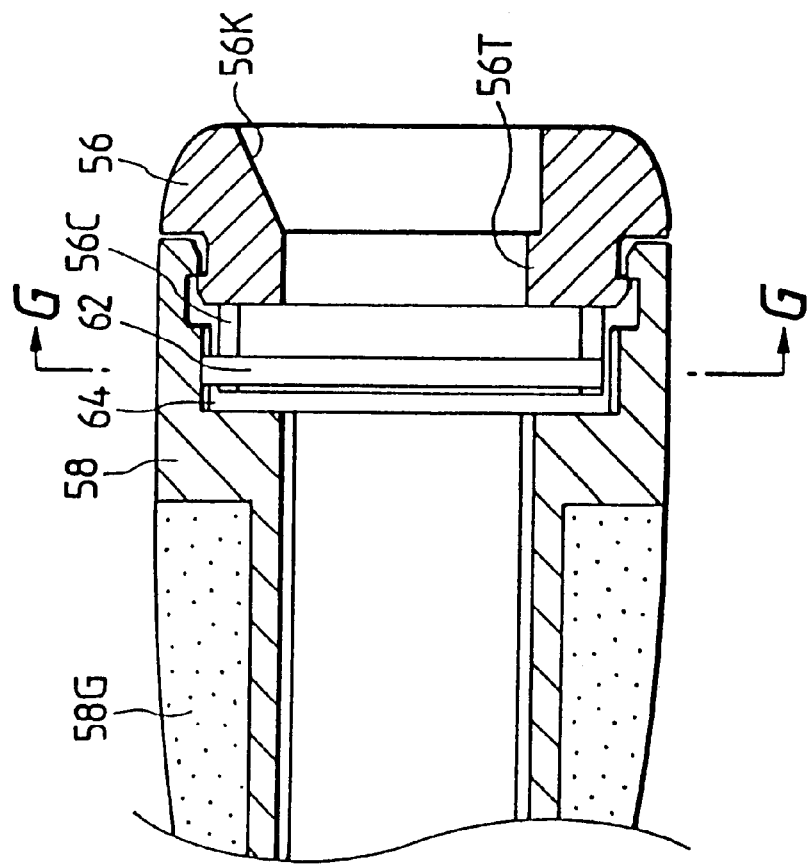

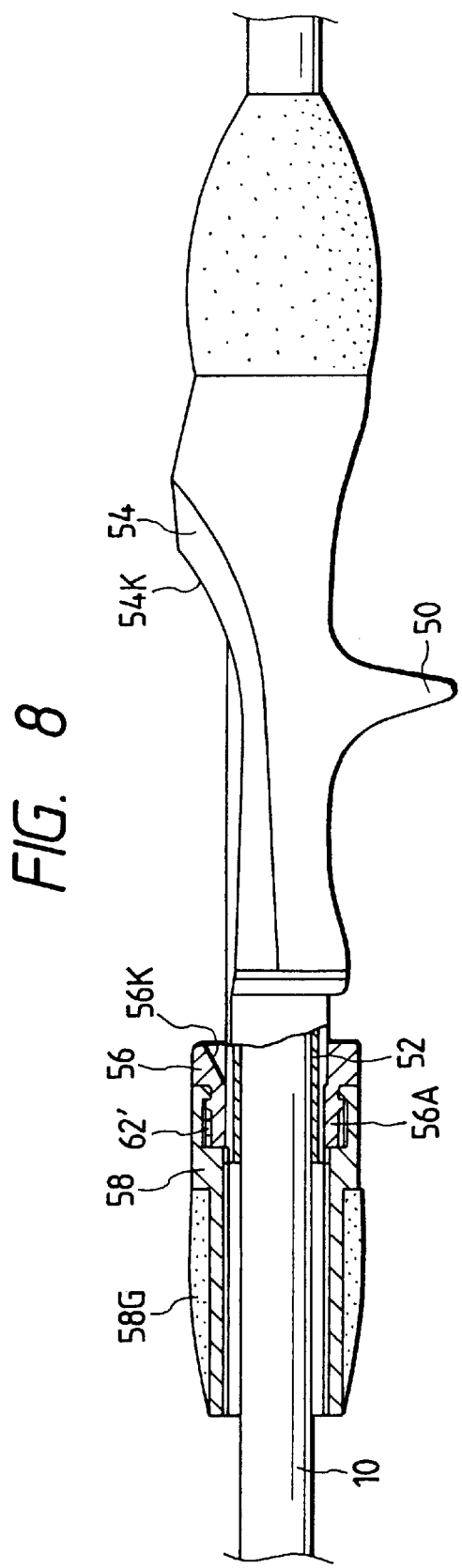

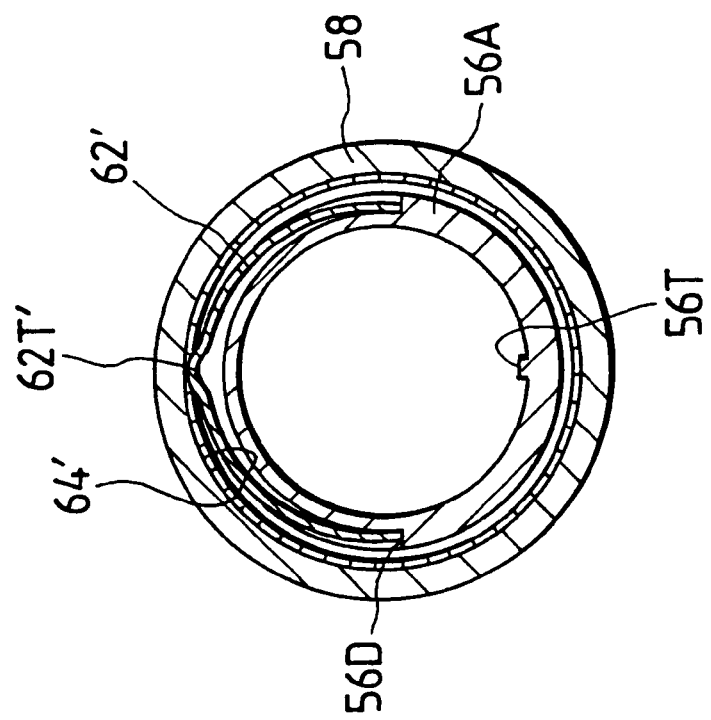
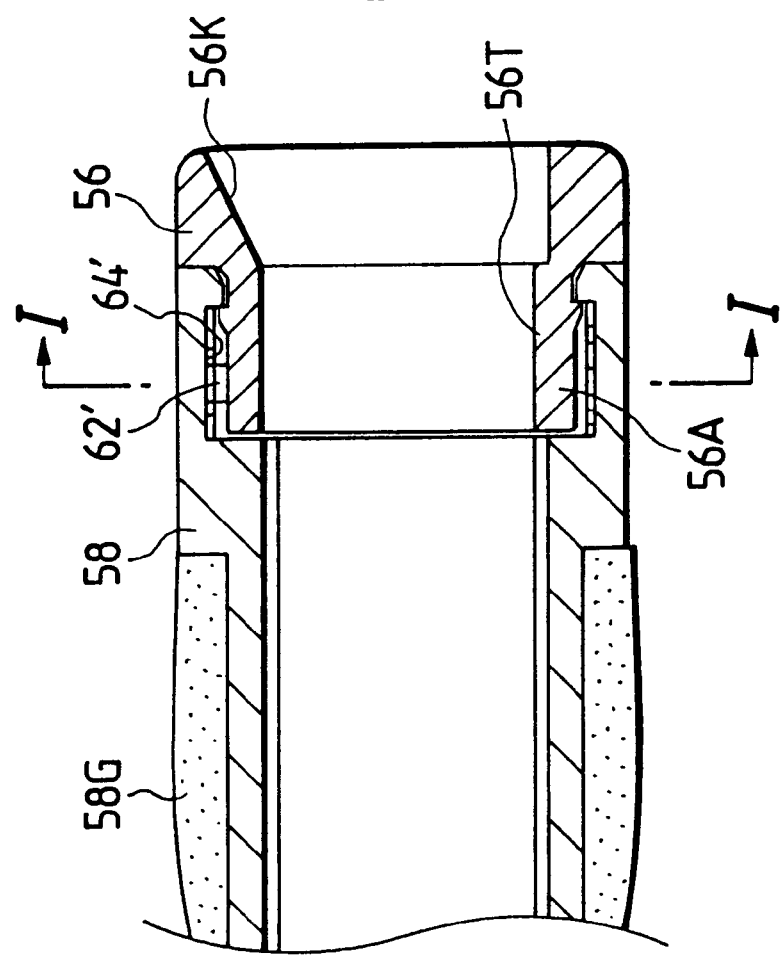

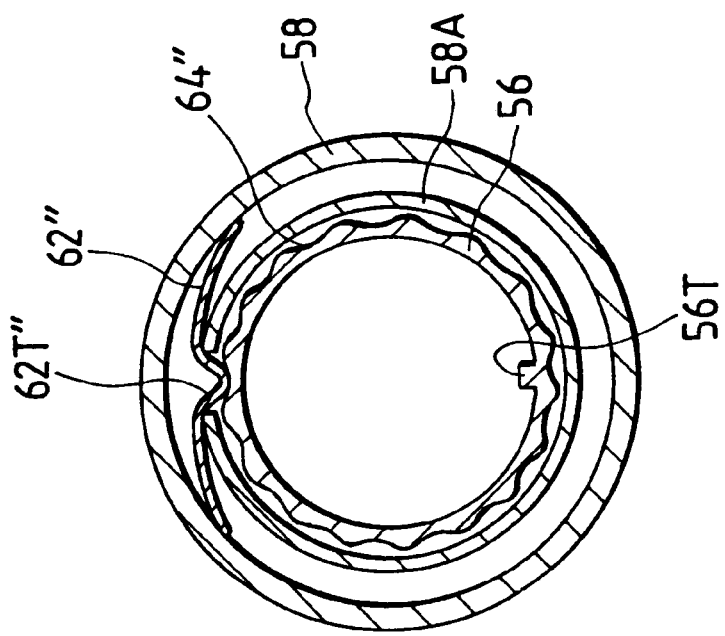
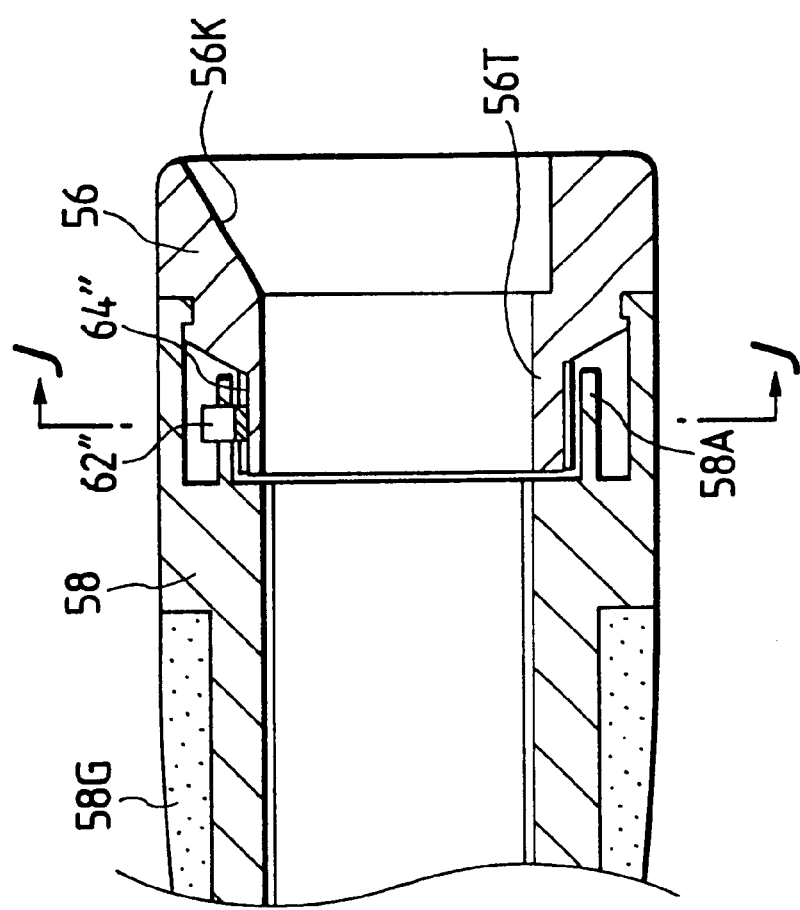

FISHING ROD OF REEL MOUNTING TYPE

BACKGROUND OF THE INVENTION

1. Field of the Invention

The present invention relates to a fishing rod which is used for fishing after a reel is mounted thereon.

2. Description of the Related Art

In a fishing rod of a type that uses a reel, there is disposed a reel mounding device for fixing a reel to the fishing rod. The reel mounting device comprises a main body portion to be fixedly secured to (or formed integrally with) the fishing rod, and a pair of hood portions respectively including a pair of mutually opposing openings. At least one of the two hood portions is a hood portion of a movable type which can be moved back and forth by a nut member to press against the leg of the reel to thereby fixedly secure the reel to the fishing rod. However, since the reel mounting device operates in various manners in fishing, the movable hood portion can be loosened unexpectedly. A device to prevent such loosened movable hood portion is disclosed in Japanese utility Model Publication No. 2-3258 of Heisei and Japanese Patent Publication No. 10-52195 of Heisei.

In the former, an engaging projection formed in an operation ring is engaged with a rotation preventive groove formed in a screw portion to thereby prevent a screw ring (nut member) from being loosened. Also, in the latter, there is interposed a rotation preventive member between a movable seat portion (movable hood portion) and a nut portion to thereby prevent the nut portion from being loosened.

However, in the former of the above-cited conventional devices, the unexpected loosening of the screw ring can be prevented but, when removing the reel, the operation ring is operated to thereby remove the engagement of the engaging projection with the rotation preventive groove and, after then, the screw ring must be rotated. Therefore, to remove the reel, it is necessary to execute a troublesome operation. Also, in the latter, the rotation preventive member is helpful in preventing the loosening of the nut member but, if a force of a given level or more is applied to the rotation preventive member, the rotation preventive member can be loosened. In this case, if an angler is able to notice a click sound caused by the removal of the above-mentioned engagement and thus tighten the nut portion again, there can be raised no problem. However, if the click sound is too low, then the angler is not be able to notice it. That is, if the angler keeps on fishing without noticing the removal of the engagement, the casting operation can be made inaccurate or the reel can be dropped down. In the structure of the latter citation, the rotation preventive member is interposed between the movable seat portion and nut portion and is normally pressed by the movable seat portion to which a reactive force from the fixation of the reel leg is applied, thereby making it difficult to produce a loud click sound. Therefore, the angler is not be able to notice the click sound and thus the loosened condition of the rotation preventive member.

SUMMARY OF THE INVENTION

The present invention aims at eliminating the drawbacks found in the above-mentioned conventional reel mounting devices. Accordingly, it is an object of the invention to provide a fishing rod of a reel mounting type which not only is able to prevent the unexpected loosening of the fixation of the reel but also, if the reel fixation is loosened, is easy to recognize the loosened reel fixation.

In attaining the above object, according to the invention, there is provided, as a first aspect, a fishing rod of a reel mounting type which comprises: a pair of hood portions respectively disposed back and forth in such a manner that they are opposed to each other, the two hood portions respectively including openings for receiving the leg of a reel; at least one of the pair of hood portions being of a movable type, the movable hood portion being movable back and forth due to the rotation of a nut member; and, elastic mechanism and an engaging portion respectively so disposed as to extend between two of three elements, that is, a main body portion fixedly secured to a rod pipe, the above-mentioned nut member and movable hood portion, the elastic mechanism being formed in one of the above-mentioned two elements, the engaging portion being formed in the other in such a manner that the elastic mechanism can be removably engaged with the engaging portion by a given force, wherein the elastic portion of the elastic mechanism is formed considerably larger than the engaging portion, or the free portion of the elastic mechanism not restricted by the engaging portion is formed larger than the portion of the elastic mechanism contacted with and restricted by the engaging portion.

Here, the term "main body portion", which is fixedly secured to the rod pipe, may not be a part which is provided separately from the rod pipe, but may be an increased-thickness portion which is formed integrally with the rod pipe. Also, the term "fixedly secured state" may be a state in which the main body portion is fixed to the rod pipe while the reel is mounted on the fishing rod. The term "elastic mechanism" is not always limited to a single part, for example, only a spring, but may be a combination of a part with other part. In the above-cited Japanese Patent Publication No. 10-52195 of Heisei, a combination of a coiled spring 52 with a positioning pin 51 corresponds to this. When the elastic mechanism is compared with the engaging portion which is composed of repeated up and down portions, the size of the engaging portion indicates the size of a smaller one of a down portion and an up portion included in the repeated up and down portions of the engaging portion. The term "considerably larger" means twofold or more; preferably, severalfold or more; and, more preferably, tenfold or more. The nut member and movable hood portion may be provided as separate parts and then fixed to each other, or they may be formed as an integral body, for example, by injection molding or by similar mechanism. Of course, in the latter case, there is substantially no sense in providing elastic mechanism between the nut member and movable hood portion.

According to the invention, there is provided, as a second aspect, a fishing rod of a reel mounting type, comprising: a pair of hood portions respectively disposed back and forth in such a manner that they are opposed to each other, the two hood portions respectively including openings for receiving the leg of a reel; at least one of the pair of hood portions being of a movable type, the movable hood portion being movable back and forth due to the rotation of a nut member; and, elastic mechanism disposed in one of the nut member and a main body portion fixedly secured to a rod pipe, and an engaging portion formed in the other in such a manner that the elastic mechanism can be removably engaged with the engaging portion by a given force, wherein the elastic portion of the elastic mechanism is formed considerably larger than the engaging portion, or the free portion of the elastic mechanism not restricted by the engaging portion is formed larger than the portion of the elastic mechanism contacted with and restricted by the engaging portion.

According to the invention, there is provided, as a third aspect, a fishing rod of a reel mounting type, comprising: a pair of hood portions respectively disposed back and forth in such a manner that they are opposed to each other, the two hood portions respectively including openings for receiving the leg of a reel; at least one of the pair of hood portions being of a movable type, the movable hood portion being movable back and forth due to the rotation of a nut member; and, elastic mechanism disposed in one of the nut member and movable hood portion, and an engaging portion formed in the other in such a manner that the elastic mechanism can be removably engaged with the engaging portion by a given force.

According to the invention, there is provided, as a fourth aspect, a fishing rod of a reel mounting type as set forth in the third aspect, wherein the elastic portion of the elastic mechanism is formed considerably larger than the engaging portion, or the free portion of the elastic mechanism not restricted by the engaging portion is formed larger than the portion of the elastic mechanism contacted with and restricted by the engaging portion.

According to the invention, there is provided, as a fifth aspect, a fishing rod of a reel mounting type which comprises: a pair of hood portions respectively disposed back and forth in such a manner that they are opposed to each other, the two hood portions respectively including openings for receiving the leg of a reel; at least one of the pair of hood portions being of a movable type, the movable hood portion being movable back and forth due to the rotation of a nut member; and, an elastic member removably engaged with said movable hood portion by a given force in order to be able to prevent the movement of said movable hood portion, with the elastic portion of said elastic member being formed of metal.

Now, in the first aspect of the invention, the elastic mechanism and engaging portion are so disposed as to extend between two of the main body portion, nut member and movable hood portion, that is, they are disposed in one of the following three kinds of extension or in combination of them, in particular, between the main body portion and nut member, or between the main body portion and movable hood portion, or between the nut member and movable hood portion. Since the elastic mechanism is able to hold its engagement with the engaging portion up to a given force, the unexpected loosening of the reel fixation can be prevented. Also, because the elastic portion of the elastic mechanism is considerably larger in size than the engaging portion, or because the free portion of the elastic mechanism not restricted by the engaging portion is larger than the portion of the elastic mechanism that is contacted with and restricted by the engaging portion, the freedom of the sound vibration of the elastic mechanism is large and thus a click sound is easy to hear. Here, the expression "the elastic portion of the elastic mechanism is considerably larger in size than the engaging portion, or the free portion of the elastic mechanism not restricted by the engaging portion is larger than the portion of the elastic mechanism that is contacted with and restricted by the engaging portion" simply intends to express that the freedom of the sound vibration of the elastic mechanism is large and, therefore, the invention must not be limited to such expression.

In the second aspect of the invention, the elastic mechanism and engaging portion are so disposed as to extend between the nut member and main body portion, and the elastic mechanism is able to hold its engagement with the engaging portion up to a given force. Therefore, the nut member is difficult to loosen and thus the unexpected loosening of the reel fixation can be prevented. Also, the elastic mechanism and engaging portion are respectively disposed in the nut member and main body portion or vice versa, that is, they are not disposed in the movable hood portion. This means that the movable hood portion is not influenced directly by the reactive force caused by the reel fixation. This can reduce the pressure and restriction force applied to the elastic mechanism. Further, because the elastic portion of the elastic mechanism is considerably larger in size than the engaging portion, or because the free portion of the elastic mechanism not restricted by the engaging portion is larger than the portion of the elastic mechanism that is contacted with and restricted by the engaging portion, the freedom of the sound vibration of the elastic mechanism is large and thus a click sound is easy to hear.

In the third aspect of the invention, the elastic mechanism and engaging portion are respectively formed in the nut member and movable hood portion and thus the movable hood portion can be influenced directly by the reactive force caused by the reel fixation. However, since the direction of the reactive force is directed mainly in the back-and-forth direction of the movable hood portion and the engagement between the elastic mechanism and engaging mechanism is executed in the diameter direction of the elastic mechanism, the influence of the back-and-force direction reactive force on the deforming direction (diameter direction) of the elastic mechanism is small. Therefore, a click sound, which is generated when the movable hood portion (and the nut member) is loosened and the elastic mechanism is thereby removed from and engaged with the engaging portion, is difficult to suffer from the influence of the reactive force, so that the freedom of the sound vibration of the elastic mechanism is large and thus the click sound generated is easy to hear.

In the fourth aspect of the invention, because the elastic portion of the elastic mechanism of the third aspect is considerably larger in size than the engaging portion, or because the free portion of the elastic mechanism not restricted by the engaging portion is larger than the portion of the elastic mechanism that is contacted with and restricted by the engaging portion, the freedom of the sound vibration of the elastic mechanism is large and thus a click sound generated is easy to hear.

In the fifth aspect of the invention, an elastic member is removably engaged with the movable hood portion by a given force in order to be able to prevent the movement of the movable hood portion. The prevention of the movement of the movable hood portion makes it possible to prevent the reel fixation from being loosened. Also, because the elastic portion of the elastic member is formed of metal, a click sound, which is generated when the reel fixation is loosened and the engagement of the elastic portion of the elastic mechanism is thereby removed, is easy to echo as well as easy to hear.

The present disclosure relates to the subject matter contained in Japanese patent application Nos. Hei. 10-166300 (filed on May 29, 1999) and 11-19401 (filed on Jan. 28, 1999), which are expressly incorporated herein by reference in their entireties.

BRIEF DESCRIPTION OF THE DRAWINGS

In the accompanying drawings:

FIG. 7(a) is an enlarged view of the main portions of the third embodiment shown in FIG. 6, and FIG. 7(b) is a transverse section view taken along the arrow line G—G shown in FIG. 7(a);

FIG. 8 is a longitudinally sectional side view of the main portions of a fourth embodiment of a fishing rod according to the invention;

FIG. 9(a) is an enlarged view of the main portions of the fourth embodiment shown in FIG. 8, and FIG. 9(b) is a transverse section view taken along the arrow line I—I shown in FIG. 9(a);

FIG. 10(a) is an enlarged view of the main portions of a fifth embodiment of a fishing rod according to the invention, and FIG. 10(b) is a transverse section view taken along the arrow line J—J shown in FIG. 10(a);

DESCRIPTION OF THE PREFERRED EMBODIMENT

Now, description will be given below in more detail of various embodiments of a fishing rod of a reel mounting type according to the invention with reference to the accompanying drawings.

Figure 1:
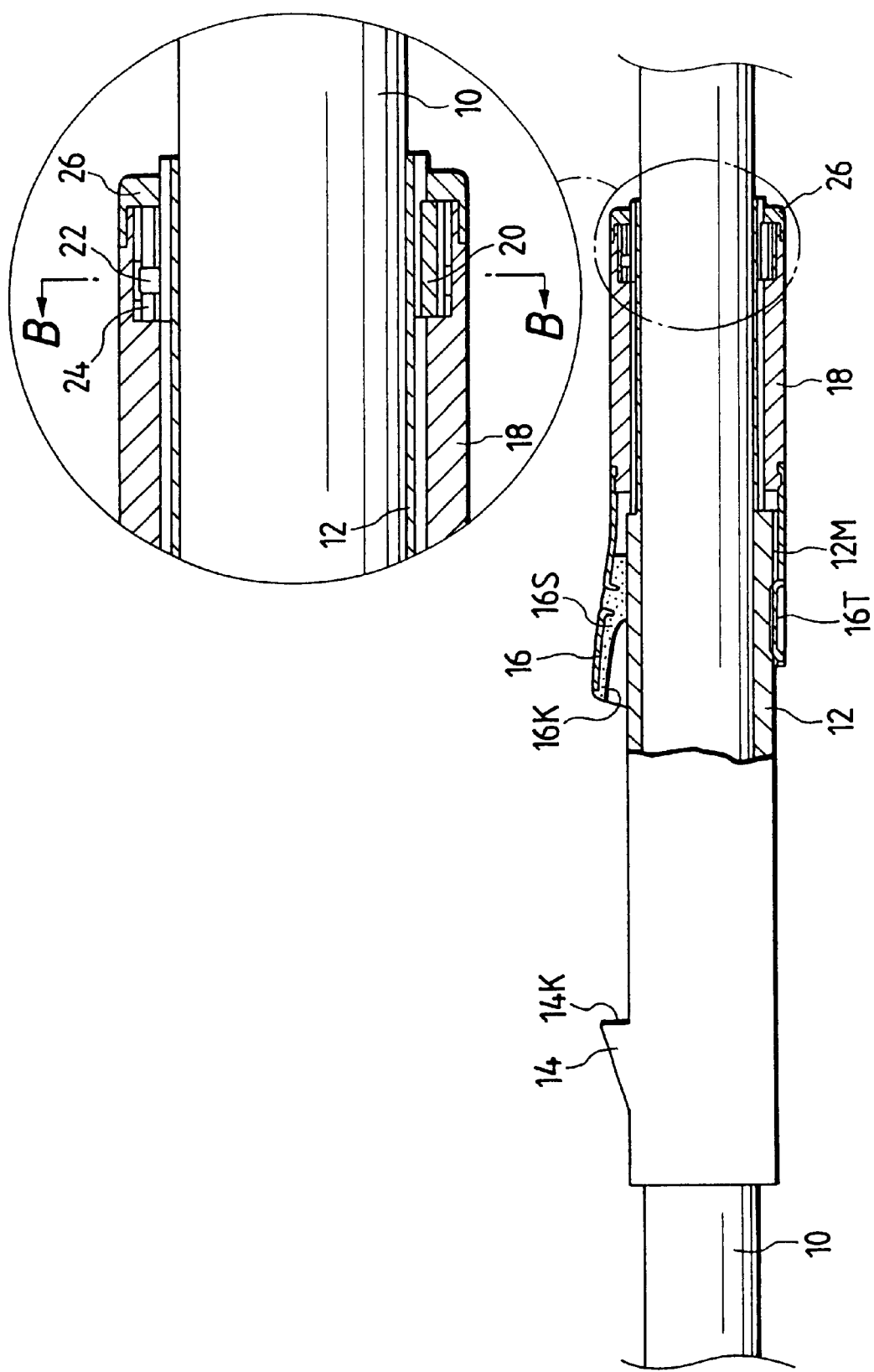
FIG. 1 is a longitudinal section view of the main portions of a first embodiment of a fishing rod according to the invention, and an enlarged view of part of the main portions.
Figure 2:
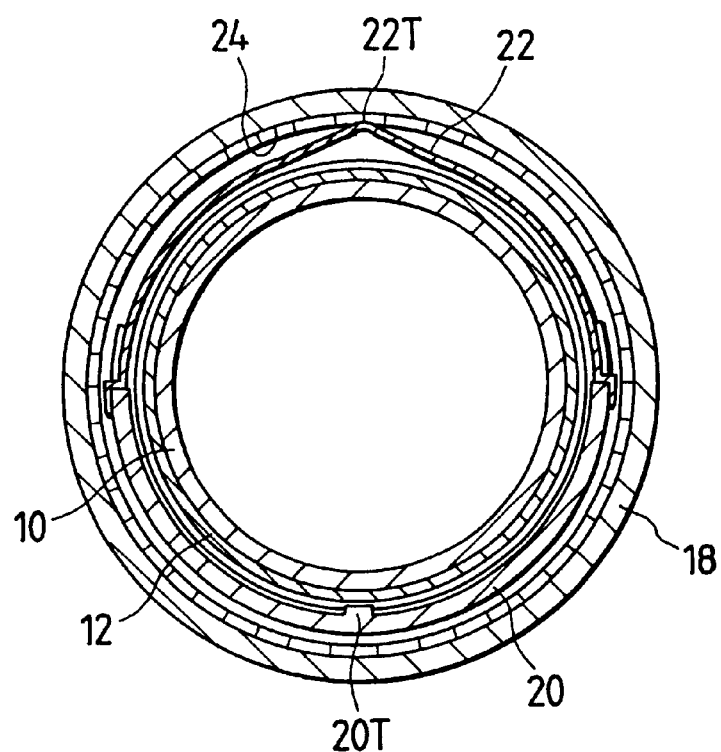
FIG. 2 is a transverse section view taken along the arrow line B—B shown in FIG. 1.

FIG. 1 is a longitudinal section view of the main portions of a first embodiment of a fishing rod of a reel mounting type according to the invention, with a portion thereof shown in an enlarged manner; and, FIG. 2 is an enlarged transverse section view taken along the arrow line B—B shown in FIG. 1. In the first embodiment, a rod pipe 10 is formed of fiber reinforced resin; in particular, synthetic resin such as epoxy resin or the like is used as a matrix, and the matrix is reinforced by reinforcing fibers such as carbon fibers or the like to thereby produce the fiber reinforced resin. A cylindrical-shaped main body portion 12 formed of synthetic resin or the like is bonded and fixed to the rod pipe 10. On one side of the main body portion 12 in the longitudinal direction thereof, there is integrally formed a fixed hood portion 14 including an opening 14K; and, on the other side of the main body 12, there is formed a male screw portion. A nut member 18 includes a female screw portion which can be threadedly engaged with the male screw portion of the main body portion 12. A movable type of hood portion 16 including an opening 16K is engaged with the nut member 18. And, the movable hood portion 16 and nut member 18 are secured to each other in such a manner that they can be rotated with respect to each other.

On the inside of the movable hood portion 16, there is disposed a member 16S formed of synthetic resin or the like to thereby form the opening 16K. In the movable hood portion 16, there is formed a securing strip portion 16T and, in the main body portion 12, there is formed a groove 12M with which the securing strip portion 16T can be engaged. Due to such engagement between the groove 12M and securing strip portion 16T, if the nut member 18 is rotated, the movable hood portion 16 can be moved back and forth in such a manner that the opening 16K and opening 14K are opposed to each other in the longitudinal direction of the main body portion 12.

In the inner peripheral portion of the nut member 18 that is situated near the end portion of the nut member 18 far away from the movable hood portion 16, there is formed an engaging portion 24 which consists of repeatedly up-and-down portions in the circumferential direction of the nut member 18 and, on the other hand, in a plate-shaped spring member 22, there is formed an engaging projecting portion 22T which can be engaged with the engaging portion 24 of the nut member 18. And, the end portion of the spring member 22 is held by a semiannular member 20. In this case, the semiannular member 20 and spring member 22 cooperates together in forming an elastic mechanism. The projecting strip portion 20T of the semiannular member 20 is engaged with a longitudinally extending groove formed in the male screw portion of the main body portion 12 and, therefore, even if the nut member 18 in engagement with the engaging projecting portion 22T is rotated, the semiannular member 20 is prevented against rotation but can be moved back and forth. Here, reference character 26 designates a cover member which covers the rear end of the nut member 18 to thereby prevent a connected body, which consists of the spring member 22 and semiannular member 20, from being removed backwardly.

In the above-mentioned structure, when the reel is fixed by the fixed hood portion 14 and movable hood portion 16, even if the nut member 18 is likely to be loosened during fishing, the loosening of the nut member 18 can be prevented in the following manner: that is, the engaging portion 24 of the inner peripheral portion of the nut member 18 is engaged with the engaging projecting portion 22T of the spring member 22, the spring member 22 is held by the semiannular member 20, and the projecting strip portion 20T of the semiannular member 20 is engaged with the longitudinally extending groove of the main body portion 12, thereby being able to prevent the nut member 18 against rotation and thus against loosening until such external force is applied to the nut member 18 that can deform the spring member 22 elastically to thereby remove the engagement between the engaging projecting portion 22T and engaging portion 24. However, if the external force exceeds this, then the nut member 18 is rotated and is thereby loosened, whereby there is produced a click sound.

The two end portions of the spring member 22 are held by the semiannular member 20, but the remaining or most portions of the spring member 22 are not restricted by the semiannular member 20 and thus can be freely vibrated and deformed. Also, in this case, when compared with the size of the engaging portion 24, the freely deformable portions of the spring member 22 are considerably large. Therefore, such freely deformable portions of the spring member 22 are capable of generating a loud sound and thus the angler is able to know from the click sound that the nut member 18 is loosened. Further, the spring member 22 is made of metal such as spring steel or the like and the click sound thereof is a metallic sound; and, therefore, the metallic click sound of the spring member 22 is easy to hear. Generally, steel material (hard metal) such as spring steel, stainless steel and the like generate high sounds, and soft metal such as brass copper, titanium and the like generate rather low sounds. The high sounds are easiest to hear but, according to cases, the lowish sounds may be selected.

The engaging portion 24 according to the present embodiment is part of the nut member 18 formed of synthetic resin and thus it is formed of synthetic resin. However, the portion of the engaging portion 24 that can be contacted by the spring member 22 may also be formed of metal. Also, if the metal member or the engaging portion 24 of the nut member 18 is partially fixed to the nut member 18 which is a mounting main body and then the remaining larger portions of the nut member 18 are made to float from the metal member, then a click sound generated is allowed to echo better so that the click sound is easier to hear. Depending on the conditions of the structure, the click sound is allowed to resound and thus the click sound is further easier to hear. The structure arrangement for easy hearing of the click sound can also apply similarly to the following embodiments, which will be discussed later herein, of the invention.

Thus, thanks to the above-mentioned structure, when the nut member 18 is rotated to thereby move the movable hood portion 16 in the fixing direction of the reel leg, there can also be generated a click sound.

In the above-mentioned embodiment, the mechanism for generation of the click sound is disposed in the neighborhood of the end portion of the nut member 18 that is far away from the movable hood portion 16. However, the click sound generating mechanism may also be disposed in the central portion of the nut member 18, or in the neighborhood of the end portion of the nut member 18 that is near to the movable hood portion 16, or in the connecting portion of the nut member 18 with the movable hood portion 16, or in the neighborhood of the end portion of the movable hood portion 16 that is near to the nut member 18. If the click sound generating mechanism is disposed in the neighborhood of the end portion of the nut member 18 that is far away from the movable hood portion 16, then an operation to incorporate the click sound generating mechanism can be facilitated. Also, generally, the outside diameter of the nut member 18 is set larger in the neighborhood of the movable hood portion 16, whereas the other end side thereof is formed narrowish; and, the other end side of the narrow-diameter is formed in such a manner that it is smoothly continuous with the surface of the rod pipe. Thus, the central portion of the nut member 18 or the end portion thereof situated near to the movable hood portion 16 is formed rather large in thickness, or there is a largish space between the main body portion 12 and one of them, so that it is easy to disposed the click sound generating mechanism there.

Figure 3:
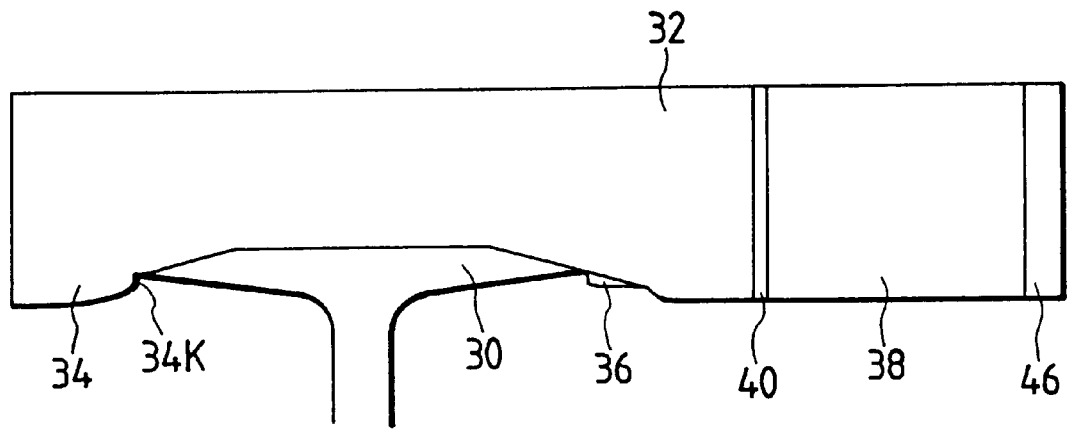
FIG. 3 is a side view of the main portions of a second embodiment of a fishing rod according to the invention.
Figure 4:
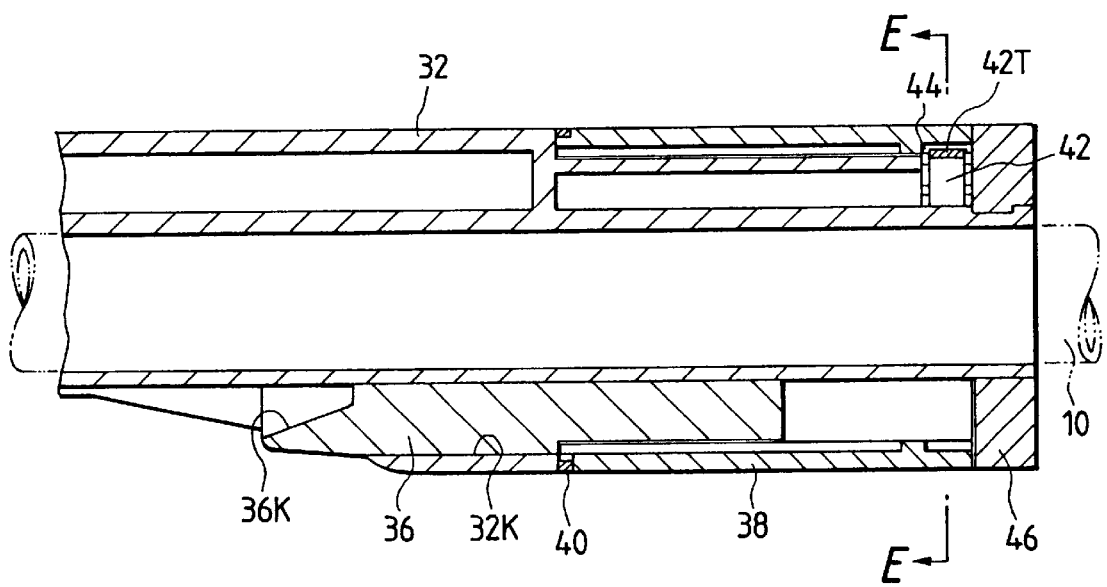
FIG. 4 is a longitudinal section view of the main portions of the second embodiment shown in FIG. 3.
Figure 5:
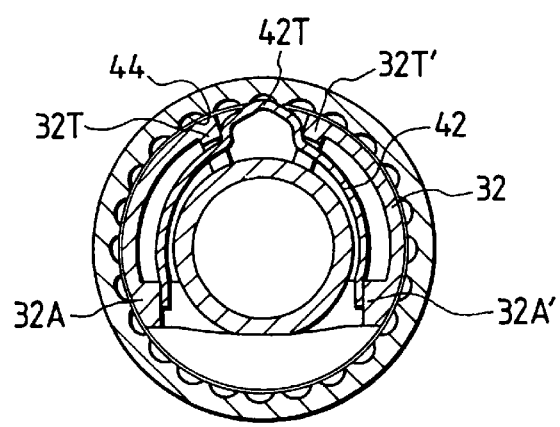
FIG. 5 is a transverse section view taken along the arrow line E—E shown in FIG. 4.

Now, FIGS. 3 to 5 respectively show a second embodiment of a fishing rod of a reel mounting type according to the invention. In particular, FIG. 3 is a side view of a reel mounting portion employed in the present fishing rod, FIG. 4 is a longitudinal section view of the main portions of the present reel mounting portion, and FIG. 5 is a transverse section view taken along the arrow line E—E shown in FIG. 4. A fixed hood portion 34, which includes an opening 34K for receiving one end portion of a reel leg 30, is formed integrally at a front-side given position (in FIG. 3, at a lower-side given position) of a cylindrical-shaped main body portion 32 integrally fixed to the rod pipe 10 by adhesion or the like; and, a movable hood portion 36 including an opening 36K is disposed in such a manner that it is opposed to the fixed hood portion 34 and it can be moved back and forth. The movable hood portion 36 can be moved back and forth while it is restricted by wall portions that define a space portion 32K formed in the main body portion 32.

Also, in the rear portion of the movable hood portion 36, there is formed a male screw portion with which a nut member 38 is threadedly engaged. The nut member 38 is interposed between a cover member 46 fixed to the rear end of the main body portion 32 and a stepped portion formed in the main body portion 32 in such a manner that the nut member 38 can be rotated between them. Therefore, since the nut member 38 is prevented from moving back and forth even if it is rotated, the movable hood portion 36, which is threadedly engaged with the nut member 38, is moved back and forth. The leg of the reel is fixedly secured by this pair of hood portions 34 and 36. In FIGS. 3 and 4, reference character 40 designates a friction preventive ring which is disposed on the end face of the nut member 38, while the ring 40 serves not only as a friction preventive element but also as a design element.

In the second embodiment as well, at a similar position to the first embodiment (in particular, the end portion of the nut member 38 on the opposite side of the movable hood portion 36), there is disposed a loosening preventive device which is used to prevent the unexpected loosening of the nut member 38. That is, in the inner peripheral portion of the nut member 38, there is formed an engaging portion 44 which consists of alternately arranged up and down portions; and, on the other hand, the two end portions of a bent plate spring member 42 are pressed against a pair of projecting portions 32A and 32A' respectively disposed on the main body portion 32 (in particular, which are disposed at positions which provide chords distant from the diameter when the two projecting portions 32A and 32A' are connected together), thereby restricting or preventing the nut member 38 from spreading out in the right and left directions in FIG. 5, while the spring member 42 is pressed and held by the reactive force caused by the above restricting action.

Also, because the bent top portion 42T of the spring member 42 is engaged with the engaging portion 44 of the nut member 38, the bent top portion 42T is able to prevent the unexpected loosening of the nut member 38. The movement of the base portion of the top portion 42T in the right and left directions thereof is restricted by a pair of projecting portion 32T and 32T' which are respectively provided on the main body portion 32. If the nut member 38 is rotated 38, then the spring member 42, from the state of FIG. 5, is pushed out from one down portion of the engaging portion 44 and moved up onto its adjoining up portion of the engaging portion 44, so that the spring member 42 moves downward in FIG. 5, that is, in a direction where the top of the top portion 42T and the center of rotation of the nut member 38 are connected to each other. However, since the pair of projecting portions 32A and 32A' are disposed at the positions which provide the chords distant from the diameter, if the spring member 42 is moved down, then there is generated a reactive force which moves upwardly in response to the downward movement of the spring member 42, so that the spring member 42 is engaged again with the adjoining down portion of the nut member 38.

When the spring member 42 moves from its formerly contacted down portion of the nut member 38 to the adjoining down portion thereof, there is generated a click sound because the spring member 42 is elastically deformed and is thereby collided with the up and down portions of the engaging portions of the engaging portion 44. In this operation, the spring member 42 is restricted only by the pair of projecting portions 32T and 32T' and the pair of projecting portions 32A and 32A', whereas the remaining portions can be freely vibrated and deformed, so that a loud sound can be generated. Therefore, if such a large external force to be able to remove the engagement between the bent top portion 42T of the spring member 42 and the engaging portion 44 of the nut member 38 is applied to the nut member 38 and the nut member 38 is thereby loosened and rotated, then an angler is able to hear that the nut member 38 has been loosened. By the way, a click sound is also generated when the nut member 38 is rotated in a direction where the reel leg is fixed.

In the second embodiment, the preventive device for preventing the unexpected rotation of the nut member, similarly to the first embodiment, is not in contact with the movable hood portion 36 and thus does not receive directly the reactive force of the reel leg fixation. Therefore, the vibration and deformation of the click sound are not restricted by the reactive force and thus a loud click sound can be generated easily.

Figure 6:
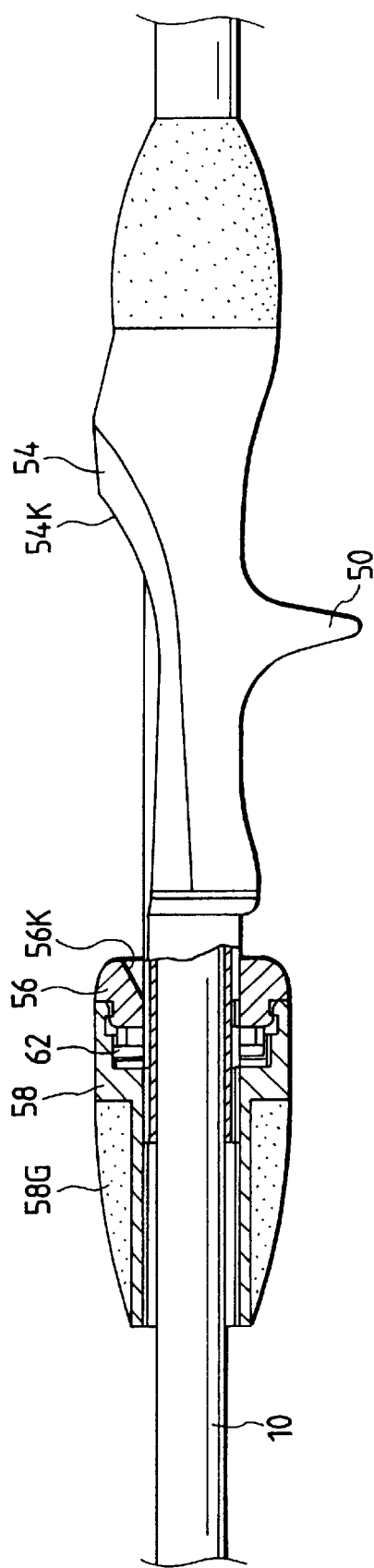
FIG. 6 is a longitudinally sectional side view of the main portions of a third embodiment of a fishing rod according to the invention.

Now, FIG. 6 is a partially broken side view of the main portions of a third embodiment of a fishing rod of a reel mounting type according to the invention, while FIG. 7(a) is an enlarged view of the main portions shown in FIG. 6, and FIG. 7(b) is a transverse section view taken along the arrow line G—G. In FIG. 7, the rod pipe 10 and a main body portion 52 are omitted. In the third embodiment, the rod pipe 10 is inserted into a base member, the base member is then bonded to the rod pipe 10 by adhesion or the like, and a trigger 50 is next formed in the base member to thereby provide a main body portion 52 of a reel mounting device; and, after then, in the rear portion of the main body portion 52, there is formed a fixed hood portion 54 including an opening 54K. In the front portion of the main body portion 52, there is formed a male screw portion; and, with the male screw portion of the main body portion 52, there is threadedly engaged a nut member 58 including in the surface portion thereof a foaming member 58G which is capable of enhancing the holding feeling of the nut member 58. On the end portion of the nut member 58 that is opposed to the fixed hood portion 54, there is disposed or engaged a movable hood portion 56 including an opening 56K in such a manner that the fixed and movable hood portions 54 and 56 can be rotated with respect to each other. In the moving hood portion 56, there is formed a securing strip portion 56T. That is, since the securing strip portion 56T of the moving hood portion 56 is engaged with a groove which is formed in the main body portion 52 in such a manner that it extends in the longitudinal direction of the main body portion 52, if the nut member 58 is rotated, then the movable hood portion 56 is moved back and forth or in the longitudinal direction of the main body portion 52.

In the rear end portion of the movable hood portion 56, there are provided a pair of arc-shaped projecting portions 56C and 56C', while the respective end edges of the two projecting portions 56C and 56C' restrict or prevent a spring member 62, which has a similar shape to the spring member previously discussed in the second embodiment, from being spread or deformed in the right and left directions. On the inner peripheral portion of the nut member 58, there are formed an up-and-down engaging portion 64 in such a manner that it is arranged in the circumferential direction of the nut member 58, while the top portion 62T of the spring member 62 is engaged with the engaging portion 64. If the nut member 58 is rotated by a force which can overcome the force of the engagement between the engaging portion 64 and top portion 62T, then the movable hood portion 56 can be moved back and forth and also, with the rotation of the movable hood portion 56, there can be generated a click sound.

Accordingly, after the reel is fixed, although the nut member 58 is prevented from loosening unless an expected force exceeding the above-mentioned engagement force is applied to the nut member 58, if a force exceeding the engagement force is applied to the nut member 58, then the spring member 62 is elastically deformed and is thereby removed from the down portion of the engaging portion 64, with which the spring member 62 is engaged at the then time, to thereby move up onto its adjoining up portion of the engaging portion 64 and thus be able to store its spring force or elastic force; and, due to the stored elastic force, the spring member 62 is then moved down into and engaged with the adjoining down portion of the engaging portion 64. Similarly to the second embodiment, the spring member 62 is in contact with the respective end edges of the pair of projecting portions 56C and 56C' of the movable hood portions 56, whereas the remaining portions of the spring member 62 are free and thus can be freely vibrated and deformed. This makes it possible to make louder a click sound which is generated when the spring member 62 moves from a certain down portion of the engaging portion 64 to the adjoining down portion thereof.

In the third embodiment, while the spring member 62 is disposed in the movable hood portion 56, the spring force in the engagement between the engaging portion 64 of the nut member 58 and the top portion 62T of the spring member 63 acts in a direction at right angles to the longitudinal direction of the fishing rod. On the other hand, the reactive force applied to the movable hood portion 56 from the fixed reel leg acts mainly in the axial or longitudinal direction of the fishing rod where the movable hood portion 56 is removed from the fixed hood portion 54. Therefore, in spite of the fact that the spring member 62 is mounted in the movable hood portion 56, the reactive force given to the movable hood portion 56 has only a small effect on the click sound and thus, when compared with a case in which the spring force acts in the longitudinal direction of the fishing rod, the click sound can be made louder.

Now, FIGS. 8 and 9 respectively show a fourth embodiment of a fishing rod of a reel mounting type according to the invention. Since the fourth embodiment can also well be said that it is a modification of the above-mentioned third embodiment, in the fourth embodiment, description will be given below mainly of different portions thereof from the third embodiment. A movable hood portion 56 having an opening 56K includes a cylindrical portion 56A formed in the end portion thereof, while a stepped portion 56D is formed in the cylindrical portion 56A. The two end portions of a bent plate spring member 62' are respectively secured to the stepped portion 56D of the cylindrical portion 56A, while the top portion 62T' of the spring member 62' is engaged with an up-and-down engaging portion 64' formed in the inner peripheral portion of a nut member 58. If the nut member 58 is rotated, then the spring member 62' is elastically deformed and is thereby removed from the then engaged down portion of the engaging portion 64' and, due to the elastic force that is stored through this elastic deformation, the spring member 62' is then moved down into the adjoining down portion of the engaging portion 64', whereby there is generated a click sound. Because the other remaining portions of the spring member 62' than the two end portions thereof are not restricted, they can be freely vibrated and deformed, so that there can be generated a loud click sound.

In the fourth embodiment, the spring member side and engaging portion side can also be reversed.

Now, in FIG. 10, there is shown an example of the above-mentioned reversed structure, that is, a fifth embodiment of the invention. Here, while the fifth embodiment is compared with the embodiment shown in FIG. 7, description will be given below mainly of the parts of the fifth embodiment that are different from those of the structure shown in FIG. 7. On the side end portion of a nut member 58 that is situated on the movable hood portion 56 side, there is extended a cylindrical portion 58A in such a manner that it is opposed to the outer periphery of the rear end portion of the movable hood portion 56 and, between the extended cylindrical portion 58A and the main body of the nut body 58, there is interposed a plate spring member (or, a linear-shaped spring member) 62", while the plate spring member 62", as shown in FIG. 10(b), includes a top portion 62T" which is projected toward the central direction of the nut member 58. In the extended cylindrical portion 58A, there is formed a slit having a width which allows the top portion 62T" of the plate spring member 62", to be inserted into the slit; that is, while holding the top portion 62T" by and between the two sides of the slit, the two end portions of the top portion 62T" are contacted with the inner surface of the nut member 58 main body against the spring force of the top portion 62T" of the plate spring member 62" to thereby hold the plate spring 62". On the other hand, on the outer periphery of the rear end cylindrical portion of the movable hood portion 56, there is formed an up-and-down engaging portions 64", while the engaging portions 64" is engaged with the top portion 62T" of the plate spring member 62. In the thus structured fifth embodiment, the operation and effect thereof are similar to those of the previously described respective embodiments.

Figure 11:
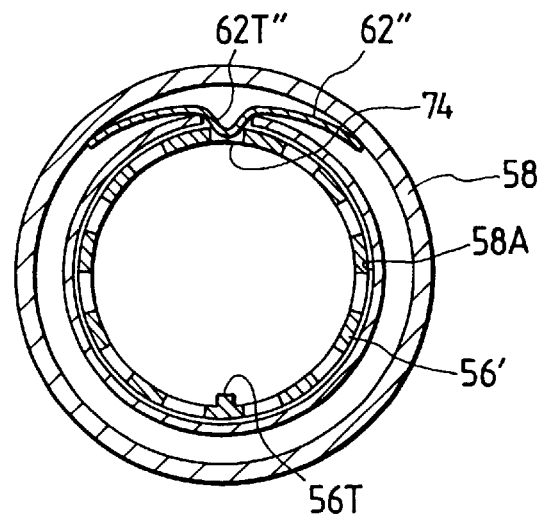
FIG. 11 is a transverse section view of the main portions of a sixth embodiment of a fishing rod according to the invention.

Further, as a modification of the structure shown in FIG. 10(b), there is shown a sixth embodiment in FIG. 11. The sixth embodiment is different from the fifth embodiment mainly in that the rear end cylindrical portion 56' of the movable hood portion 56 provides an up-and-down engaging portion 74 in which there are formed uniformly spaced through holes. When compared with the structure shown in FIG. 10, in the structure shown in FIG. 11, a click sound is easier to echo and can be made louder.

Figure 12:
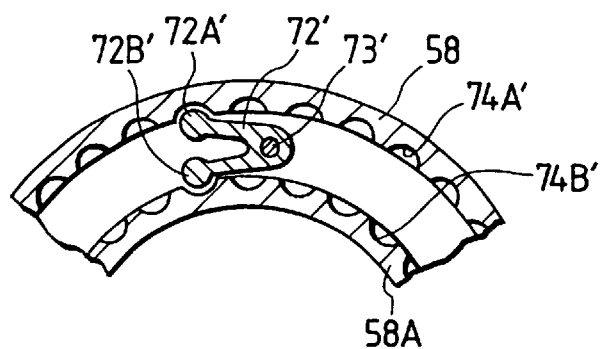
FIG. 12 is an enlarged section view of the main portions of a seventh embodiment of a fishing rod according to the invention.

Now, FIG. 12 shows another modification of the above structure, that is, a seventh embodiment. As shown in FIG. 12, on the inner peripheral surface of the nut member main body 58 and the outer periphery of the extended cylindrical portion 58A, there are formed up-and-down engaging portions 74A' and 74B' respectively; and, a plate spring member (or a linear-shaped spring member) 72' disposed on the tip end of a shaft portion 73' mounted on the movable hood portion 56 is interposed between the two up-and-down engaging portions 74A' and 74B'. The leading end portion of the plate spring member 72' is divided to two engaging elements which respectively include engaging portions 72A' and 72B', while the two engaging portions 72A' and 72B' can be engaged with the two up-and-down engaging portions 74A', and 74B' respectively. Therefore, in the structure shown in FIG. 12, there can be generated a further louder click sound.

The above-mentioned seventh embodiment can also be modified. That is, in this modification, the extended cylindrical portion 58A serves as a main body portion which is fixedly secured to the rod pipe, the shaft portion 73' is omitted, the plate spring member 72' is arranged in a free state, and the two engaging portions 72A' and 72B' of the plate spring member 72' are respectively to be engaged with the up-and-down engaging portions 74A' of the inner surface of the nut member 58 and the up-and-down engaging portions 74B' of the outer periphery of the main body portion 58A. In FIG. 12, if the nut member 58 is rotated counterclockwise, then the engaging portion 72A' is pressed down, whereas the other engaging portion 72B' is pressed against the up-and-down engaging portions 74B' side, with the result that, while the spring member 72' is being held with respect to the main body portion 58A, a click sound is generated on the engaging portion 72A' side. On the other hand, if the nut member 58 is rotated in the opposite direction, then the engaging portion 72A' is caught by the up-and-down engaging portions 74A' and is thereby rotated in such a manner that it drags the plate spring member 72'. As a result of this, there can be generated a click sound between the other engaging portion 72B' and the up-and-down engaging portion 74B' of the main body portion 58A.

Therefore, if the shapes and material of the two up-and-down engaging portions 74A' and 74B' are made to differ from each other, or if the engaging portions 72A' and 72B' of the plate spring member 72' are made to differ from each other, then there can be generated different click sounds according to the directions of rotation of the nut member 58. The two members 58 and 58A may be any two members which can be rotated with respect to each other. For example, the member 58 may be a movable hood portion which can be rotated and moved together with a nut member. Also, the plate spring member 72' can also be structured such that it is held by any one of the two members 58 and 58A.

Figure 13:
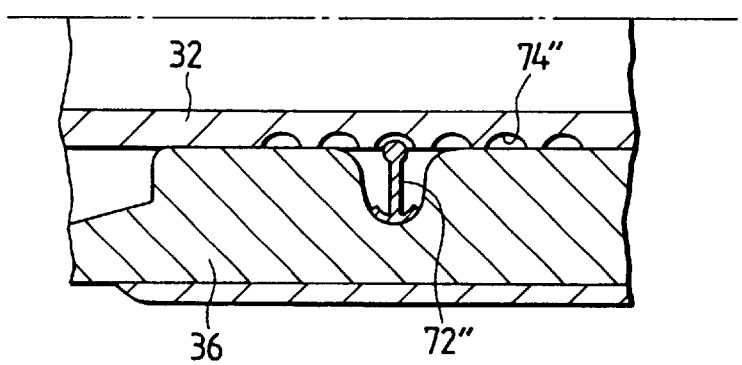
FIG. 13 is a longitudinal section view of the main portions of an eighth embodiment of a fishing rod according to the invention.

Now, FIG. 13 shows a portion of an eighth embodiment of a fishing rod according to the invention. In fact, the eighth embodiment is a modification of the structure shown in FIG. 4, in which the movable hood portion 36 can be moved only back and forth linearly and there is employed a device to prevent the unexpected loosening of the movable hood portion 36. In particular, a plate spring member 72", which is mounted on and fixed to the movable hood portion 36 and is directed in the radial direction of the movable hood portion 36, is engaged with the an up-and-down engaging portion 74" formed in the main body portion 32. That is, a click mechanism is interposed between the movable hood portion 36 and the main body portion 32 which is fixed to the rod pipe. Alternatively, the present plate spring member 72" and up-and-down engaging portion 74" may be reversed.

Figure 14:
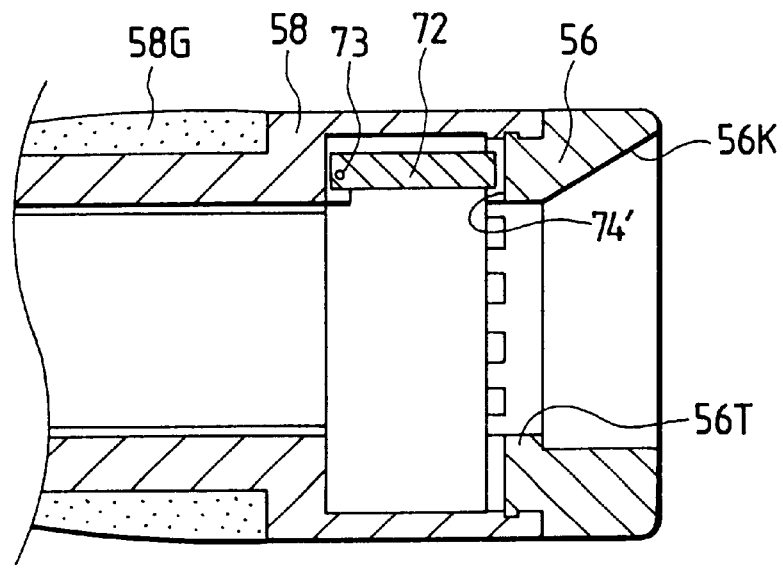
FIG. 14 is a longitudinal section view of the main portions of a ninth embodiment of a fishing rod according to the invention.

Now, FIG. 14 is a longitudinal section view of a portion of a ninth embodiment of a fishing rod according to the invention. In the ninth embodiment, a click mechanism (elastic mechanism and engaging portion) is interposed between a nut member 58 and a movable hood portion 56, while a spring member 72 is mounted in such a manner that one end portion thereof is fixed to and held by a fixed member 73 in a cantilever manner and the spring member 72 extends substantially in the axial or longitudinal direction of the fishing rod. On the rear end face of the movable hood portion 56, there is formed an up-and-down engaging portion 74' in which up and down portions are formed repeatedly in the circumferential direction of the movable hood portion 56; the spring member 72 consists of a plate spring member; and, the nut member 58 can be rotated with respect to the movable hood portion 56. If the nut member 58 is threadedly engaged with the main body portion 52 and is rotated together therewith, the movable hood portion 56 can be moved back and forth but, because the securing strip portion 56T of the movable hood portion 56 is engaged with the groove of the main body portion 52, the movable hood portion 56 is prevented against rotation.

The spring member 72 acts on the up-and-down engaging portion 74' of the movable hood portion 56 in order to prevent the nut member 58 from being rotated unexpectedly and thus prevent the movable hood portion 56 from moving in the reel leg loosening direction. However, if a force exceeding a given force is applied to the nut member 58, then the nut member 58 is rotated against the plate spring force of the spring member 72 acting on the movable hood portion 56 in the circumferential direction thereof. Only the end portion of the overall length of the plate spring member 72 is restricted, whereas the remaining portions thereof are not restricted but free. Therefore, the sound vibration of the plate spring member 72 is difficult to restrict and thus the click sound thereof is easy to be loud. To facilitate the vibration of the plate spring member 72, the thickness of the plate spring member 72 may be less than or equal to 1 mm, preferably, in the range of 0.30–0.6 mm.

In reverse, the plate spring member 72 may be mounted on the movable hood portion 56 and the up-and-down engaging portion 74' may be formed on the nut member 58 side.

Figure 16:
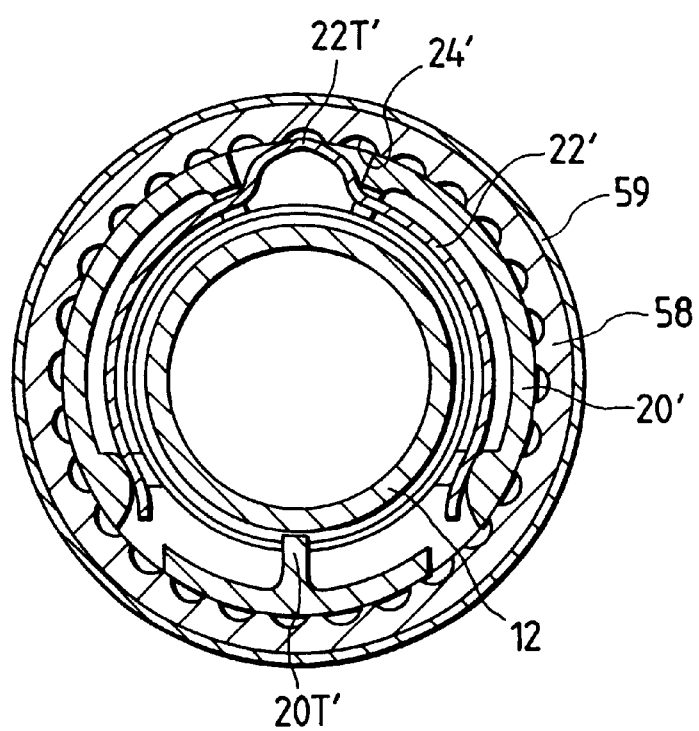
Figure 15:
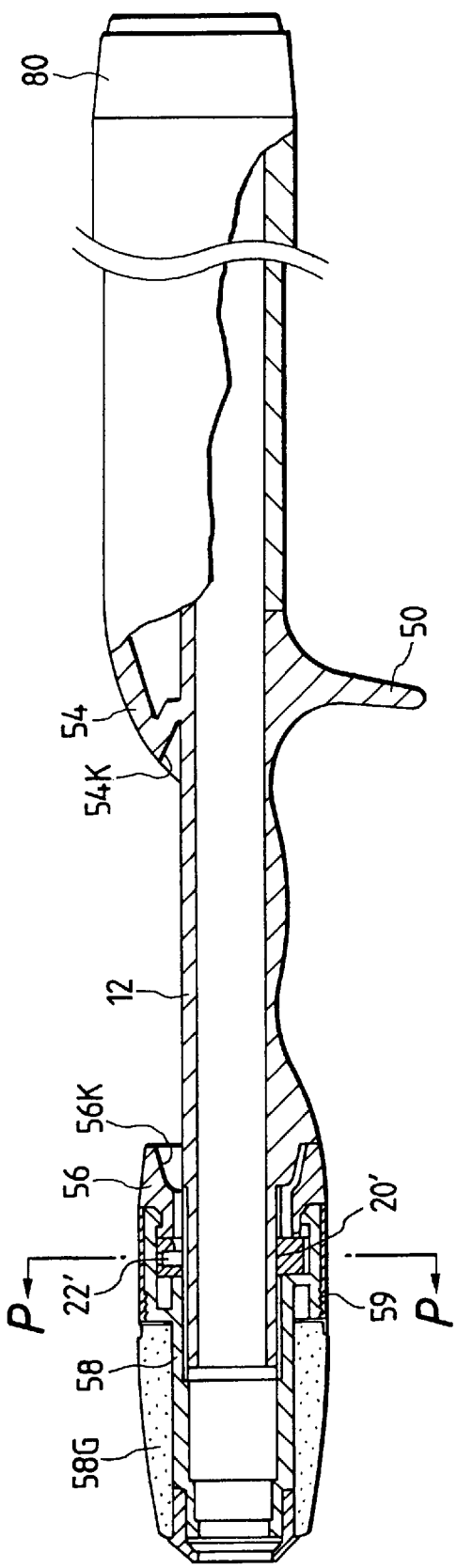
FIG. 15 is a longitudinally sectional side view of the main portions of a tenth embodiment of a fishing rod according to the invention; and, FIG. 16 is an enlarged transverse section view taken along the arrow line P—P shown in FIG. 15.

Now, FIGS. 15 and 16 show a tenth embodiment of a fishing rod according to the invention. In particular, FIG. 15 is a longitudinal section view of the main portions of the present fishing rod which are located adjacent to a reel mounting portion thereof, with the rod pipe omitted; and, FIG. 16 is an enlarged transverse section view taken along the arrow line P—P shown in FIG. 15. A fixed hood portion 54 having an opening 54K in the rear portion thereof is formed integrally with a main body portion 12 which is fixed to the rod pipe (not shown), while a trigger 50 is also formed integrally with the main body portion 12 at a position thereof which is situated below the fixed hood portion 54. On the outer periphery of the leading end portion of the main body portion 12, there is formed a male screw portion, while a nut member 58 including a female screw portion threadedly engageable with the male screw portion of the main body portion 12 is threadedly engaged with the male screw portion of the main body portion 12. A movable hood portion 56 having an annular-shaped opening 56K is rotatably engaged with the end portion of the nut member 58 that is situated on the fixed hood portion 54 side. Although the movable hood portion 56 does not need to rotate, the movable hood portion 56 is structured such that it is rotatable for the convenience of assembly. In FIG. 15, reference character 80 designates a bottom plug member.

In the male screw portion of the main body portion 12, there is formed a streak of vertical groove; and, an annular member 20', which is formed of resin and includes on the inner surface portion thereof a securing strip portion 20T' engageable with the vertical groove of the male screw portion, is disposed in the internal space of the nut member 58 and is incorporated in the fishing rod in such a manner that, while it is secured to the vertical groove of the male screw portion, it is prevented against rotation with respect to the main body portion 12 but can be moved in the vertical direction. As shown in FIG. 16, a plate spring member 22' is held within the annular member 20' due to its own spring force which can be stored as the two end portions thereof are pressed from the outside, while the top portion 22T' of the plate spring member 22' situated at the central position thereof projects outside the annular member 20'. The annular member 20' and plate spring member 22' cooperate together in forming elastic mechanism.

The inner periphery of the nut member 58 is formed as an up-and-down engaging portion 24', the top portion 22T' of the plate spring member 22' is engaged with the up-and-down engaging portion 24', and the plate spring member 22' operates similarly to the plate spring member 42 (which has been described with reference to FIG. 5) for the same reason. In the plate spring member 22', similarly to the plate spring member 42 shown in FIG. 5, the supported portion thereof occupies only a minor portion thereof, whereas the remaining portions thereof are longer than the supported portion and free, so that a loud click sound can be generated. And, a tubular member 59 formed of metal is threadedly mounted on the outer periphery of the nut member 58, in particular, on the outer peripheral portion thereof where the annular member 20' is disposed. The tubular member 59 not only can enhance the appearance of the fishing rod but also makes it easy for the click sound to echo. Also, in the remaining portions of the nut member 58, there is disposed a foaming member 58G which is formed of natural cork or dura-cork (a trade name for a non-natural cork made of EVA foam materials), thereby being able to enhance the gripping condition of the fishing rod.

As can be seen obviously from the foregoing description, according to the invention, it is possible to provide a fishing rod of a reel mounting type which has a structure that can not only prevent the reel fixation from being loosened unexpectedly but also, if loosened, can recognize the loosened condition easily.

What is claimed is:

1. A fishing rod of a reel mounting type, comprising:
a pair of hood portions respectively disposed back and forth in such a manner that said pair of hood portions are opposed to each other, said pair of hood portions respectively including openings for receiving the leg of a reel;
at least one of said pair of hood portions being of a movable type, said movable hood portion being movable back and forth due to the rotation of a nut member; and,
an elastic mechanism and an engaging portion respectively so disposed as to extend between two elements of a group consisting of a main body portion fixedly secured to a rod pipe, said nut member and said movable hood portion, said elastic mechanism being formed in one of said two elements, said engaging portion being formed in the other of said two elements in such a manner that said elastic mechanism can be removably engaged with said engaging portion by a given force,
wherein an elastic portion of said elastic mechanism is formed to interact with said engaging portion to thereby generate a click sound during relative rotation of the elastic mechanism with respect to the engaging portion.

2. A reel seat comprising:
a main body;
a pair of hoods, at least one of said hoods is movable relative to said main body;
a nut member for moving said movable hood relative to said main body by rotation of said nut member relative to said main body;
a closed chamber defined between two of said main body, said movable hood and said nut member; and
a click sound generation mechanism, installed within said closed chamber, for generating a click sound using relative movement between said two of said main body, said movable hood and said nut member.

3. A reel seat according to claim 2, wherein said click sound generation mechanism includes:
   recesses on said nut member;
   a spring supported by said main body and elastically engageable with one of said recesses.

4. A reel seat according to claim 3, wherein said click sound generation mechanism further includes:
   a semi-annular member non-rotatably but axially-movable mounted on said main body, said spring being supported by said main body through said semi-annular member.

5. A reel seat according to claim 3, wherein said body has a cylindrical part supporting said spring.

6. A reel seat according to claim 2, wherein said click sound generation mechanism includes:
   recesses on said nut member;
   a spring supported by said movable hood and elastically engageable with one of said recesses.

7. A reel seat according to claim 2, wherein said click sound generation mechanism includes:
   recesses on said movable hood;
   a spring supported by said nut member.

8. A reel seat according to claim 2, wherein said click sound generation mechanism includes:
   recesses on said main body;
   a spring supported by said movable hood and elastically engageable with one of said recesses.

9. A reel seat according to claim 2, wherein said closed chamber includes an annular space radially defined between said nut member and said main body.

10. A reel seat according to claim 2, wherein said closed chamber includes an annular space radially defined between said nut member and said movable hood.

11. A reel seat according to claim 2, wherein said closed chamber includes an annular space radially defined between said main body and said movable hood.

12. A reel seat according to claim 2, wherein said nut member threadingly engages with said main body for moving said movable hood relative to said main body by rotation and associated movement of said nut member relative to said main body.

13. A reel seat according to claim 2, wherein said nut member is fixably secured to said at least one of said hoods.

14. A reel seat according to claim 2, wherein said closed chamber includes an annular space radially defined between said main body and said nut member.

15. A reel seat according to claim 2, wherein a fixed hood, said movable hood, said nut member, and said click sound generation mechanism are sequentially aligned along a longitudinal direction defined by an axis of said main body.

16. A reel seat comprising:
   a main body;
   a first movable hood movable relative to a second hood, said first movable hood being non-rotatably disposed with respect to said main body;
   a nut member for moving said movable hood relative to said second hood by rotation of said nut member relative to said main body;
   a click sound generation mechanism for generating click sound using relative movement between said main body and said nut member.

* * * * *